United States Patent
Gulati et al.

(10) Patent No.: US 9,185,610 B2
(45) Date of Patent: Nov. 10, 2015

(54) HANDLING CELL RESELECTION TO INTRA-FREQUENCY, INTER-FREQUENCY, AND INTER-RAT CELLS OF HOME PLMN

(71) Applicant: QUALCOMM Incorporated, San Diego, CA (US)

(72) Inventors: Vikas Gulati, Hyderabad (IN); Girish Valluru, Hyderabad (IN); Yongsheng Shi, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/313,796

(22) Filed: Jun. 24, 2014

(65) Prior Publication Data
US 2015/0195755 A1   Jul. 9, 2015

Related U.S. Application Data

(60) Provisional application No. 61/924,045, filed on Jan. 6, 2014.

(51) Int. Cl.
*H04W 36/26* (2009.01)
*H04W 36/00* (2009.01)
(Continued)

(52) U.S. Cl.
CPC .......... *H04W 36/0061* (2013.01); *H04W 48/18* (2013.01); *H04W 48/12* (2013.01); *H04W 48/20* (2013.01); *H04W 88/06* (2013.01)

(58) Field of Classification Search
CPC ...... H04W 36/14; H04W 36/26; H04W 36/36
USPC ................................................ 455/436, 437
See application file for complete search history.

(56) References Cited

U.S. PATENT DOCUMENTS

| 8,068,842 B2 | 11/2011 | Nizri et al. |
| 2006/0035662 A1* | 2/2006 | Jeong ................ H04W 48/06 455/525 |

(Continued)

FOREIGN PATENT DOCUMENTS

CA    2 797 928 A1    6/2013

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) procedures in idle mode," Release 11, V11.6.0; Jan. 2, 2014, XP050729346, pp. 1-34.

(Continued)

*Primary Examiner* — Christopher M Brandt
(74) *Attorney, Agent, or Firm* — Arent Fox LLP

(57) ABSTRACT

A method and apparatus for wireless communications are provided. A first cell on which a user equipment (UE) is camped may be identified as a visited Public Land Mobile Network (VPLMN) of the UE. Information of a second cell among neighboring cells of the first cell may be received via a broadcast message from the first cell. The second cell may be part of a home PLMN (HPLMN) and the HPLMN may not be an equivalent PLMN (EPLMN) to the VPLMN associated with the first cell. Alternatively, the second cell may belong to an Equivalent HPLMN (EPLMN). When the second cell is determined to be a best cell according to absolute priority reselection rules or a highest ranked cell among the neighboring cells of the first cell, the second cell may not be barred for a period of time from being considered or identified as a candidate for reselection.

28 Claims, 8 Drawing Sheets

(51) Int. Cl.
*H04W 48/18* (2009.01)
*H04W 48/12* (2009.01)
*H04W 48/20* (2009.01)
*H04W 88/06* (2009.01)

(56) References Cited

U.S. PATENT DOCUMENTS

| | | | |
|---|---|---|---|
| 2008/0200146 A1 | 8/2008 | Wang et al. | |
| 2009/0088160 A1 | 4/2009 | Pani et al. | |
| 2012/0300657 A1* | 11/2012 | Jung | H04W 24/10 370/252 |
| 2013/0128754 A1* | 5/2013 | Jung | H04W 24/10 370/252 |
| 2014/0057632 A1 | 2/2014 | Hole et al. | |

OTHER PUBLICATIONS

"3rd Generation Partnership Project; Technical Specification Group Radio Access Network; User Equipment (UE) procedures in idle mode and procedures for cell reselection in connected mode (Release 12)", 3GPP TS 25.304, V12.0.0, Jan. 2, 2014, XP050729343, pp. 1-54.

"$3^{rd}$ Generation Partnership Project; Technical Specification Group Core Network and Terminals; Non-Access-Stratum (NAS) functions related to Mobile Station (MS) in idle mode (Release 12)", 3GPP Standard; 3GPP TS 23.122, $3^{rd}$ Generation Paternership Project (3GPP), Mobile Competence Centre; 650, Route Des Lucioles; F-06921 Sophia-Antipolis Cedex; France, vol, CT WG1, No. V12.3.0, Dec. 19, 2013, pp. 1-45, XP050729050.

Hutchison 3G UK 3: "Evidence of Ping-Ponging on UMTS Network", 3GPP Draft; R2-063188, 3rd Generation Partnership Project (3GPP), Mobile Competence Centre ; 650, Route Des Lucioles; F-06921 Sophia Antipolis Cedex ; France, Oct. 30, 2006, XP050017978, pp. 1-10.

International Search Report and Written Opinion—PCT/US2014/072914—ISA/EPO—Mar. 26, 2015 (141261WO). (14 total pages).

Siemens AG: "Background scan if HPLMN is part of the Equivalent PLMNs list", 3GPP Draft; N1-021130, XP050066632, May 20, 2002.

* cited by examiner

HANDLING CELL RESELECTION TO INTRA-FREQUENCY, INTER-FREQUENCY, AND INTER-RAT CELLS OF HOME PLMN

CLAIM OF PRIORITY UNDER 35 U.S.C. §119

The present Application for Patent claims priority to U.S. Provisional Application No. 61/924,045 entitled "APPARATUS AND METHOD OF HANDLING CELL RESELECTION TO INTRA-FREQUENCY, INTER-FREQUENCY, AND INTER-RAT CELLS OF HOME PLMN," filed on Jan. 6, 2014, and assigned to the assignee hereof and hereby expressly incorporated by reference herein.

BACKGROUND

Aspects of the present disclosure relate generally to wireless communication systems, and more particularly, to handling cell reselection to intra-frequency, inter-frequency, and inter-radio access technology (inter-RAT) cells of home public land mobile network (PLMN).

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Mobile Telecommunications System (UMTS) Terrestrial Radio Access Network (UTRAN). The UTRAN is the radio access network (RAN) defined as a part of the UMTS, a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

A method and apparatus for wireless communications are provided. A first cell on which a user equipment (UE) is camped on may be identified as being a visited public land mobile network (VPLMN) of the UE. Information relating to a second cell among a plurality of neighboring cells of the first cell may be received via a broadcast message from the first cell. The second cell may be part of a home PLMN (HPLMN) and the HPLMN may not be an equivalent PLMN to the VPLMN associated with the first cell. Alternatively, the second cell may belong to an equivalent HPLMN (EPLMN). When the second cell is determined to be a best cell according to absolute priority reselection rules or a highest ranked cell among the plurality of neighboring cells of the first cell, the second cell may not be barred for a period of time from being considered or identified as a candidate for reselection. Cell reselection may be triggered to the second cell or one of the other neighboring cells.

In one aspect, the disclosure provides a method for wireless communications. At a UE camped on a first cell, information relating to a second cell among a plurality of neighboring cells of the first cell is received via a broadcast message from the first cell. The first cell belongs to a VPLMN of the UE, the second cell belongs to a HPLMN of the UE, and the HPLMN is not an EPLMN of the VPLMN. It is determined whether the second cell is a best cell according to absolute priority reselection rules or a highest ranked cell among the plurality of neighboring cells of the first cell. Upon determining that the second cell is the best cell according to absolute priority reselection rules or the highest ranked cell, the second cell is identified as a candidate for cell reselection without being barred for a period of time from cell reselection.

Another aspect of the disclosure provides an apparatus for wireless communications. The apparatus includes means for receiving, at a UE camped on a first cell, information relating to a second cell among a plurality of neighboring cells of the first cell via a broadcast message from the first cell. The first cell belongs to a VPLMN of the UE, the second cell belongs to a HPLMN of the UE, and the HPLMN is not an EPLMN of the VPLMN. The apparatus includes means for determining whether the second cell is a best cell according to absolute priority reselection rules or a highest ranked cell among the plurality of neighboring cells. The apparatus further includes means for considering the second cell as a candidate for reselection without barring the second cell for a period of time, upon determining that the second cell is the best cell according to absolute priority reselection rules or the highest ranked cell.

Another aspect of the disclosure provides a cell reselection component in a user equipment for wireless communications. The cell reselection component includes a receiving component configured to receive a second cell among a plurality of neighboring cells of a first cell on which the UE is camped on, via a broadcast message from the first cell. The first cell belongs to a VPLMN of the UE, the second cell belongs to a HPLMN of the UE, and the HPLMN is not an EPLMN of the VPLMN. The cell reselection component further includes a cell determination component configured to determine whether the second cell is a best cell according to absolute priority reselection rules or a highest ranked cell among the plurality of neighboring cells of the first cell. The cell reselection component further includes an identifying component configured to identify the second cell as a candidate for reselection without barring the second cell for a period of time, upon determining that the second cell is the best cell according to absolute priority reselection rules or the highest ranked cell.

Still another aspect of the present disclosure provides a computer readable medium storing computer executable code. The computer readable medium includes code for causing a processor to receive a second cell among a plurality of neighboring cells of a first cell on which the UE is camped, via a broadcast message from the first cell. The first cell belongs to a VPLMN of the UE, the second cell belongs to a HPLMN of the UE, and the HPLMN is not an EPLMN of the VPLMN. The computer readable medium further includes code for causing the processor to determine whether the second cell is a best cell according to absolute priority reselection rules or a highest ranked cell among the plurality of neighboring cells of the first cell. The computer readable medium further includes code for causing the processor to identify the second cell as a candidate for reselection without barring the second cell for a period of time, upon determining that the second cell is the best cell according to absolute priority reselection rules or the highest ranked cell.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
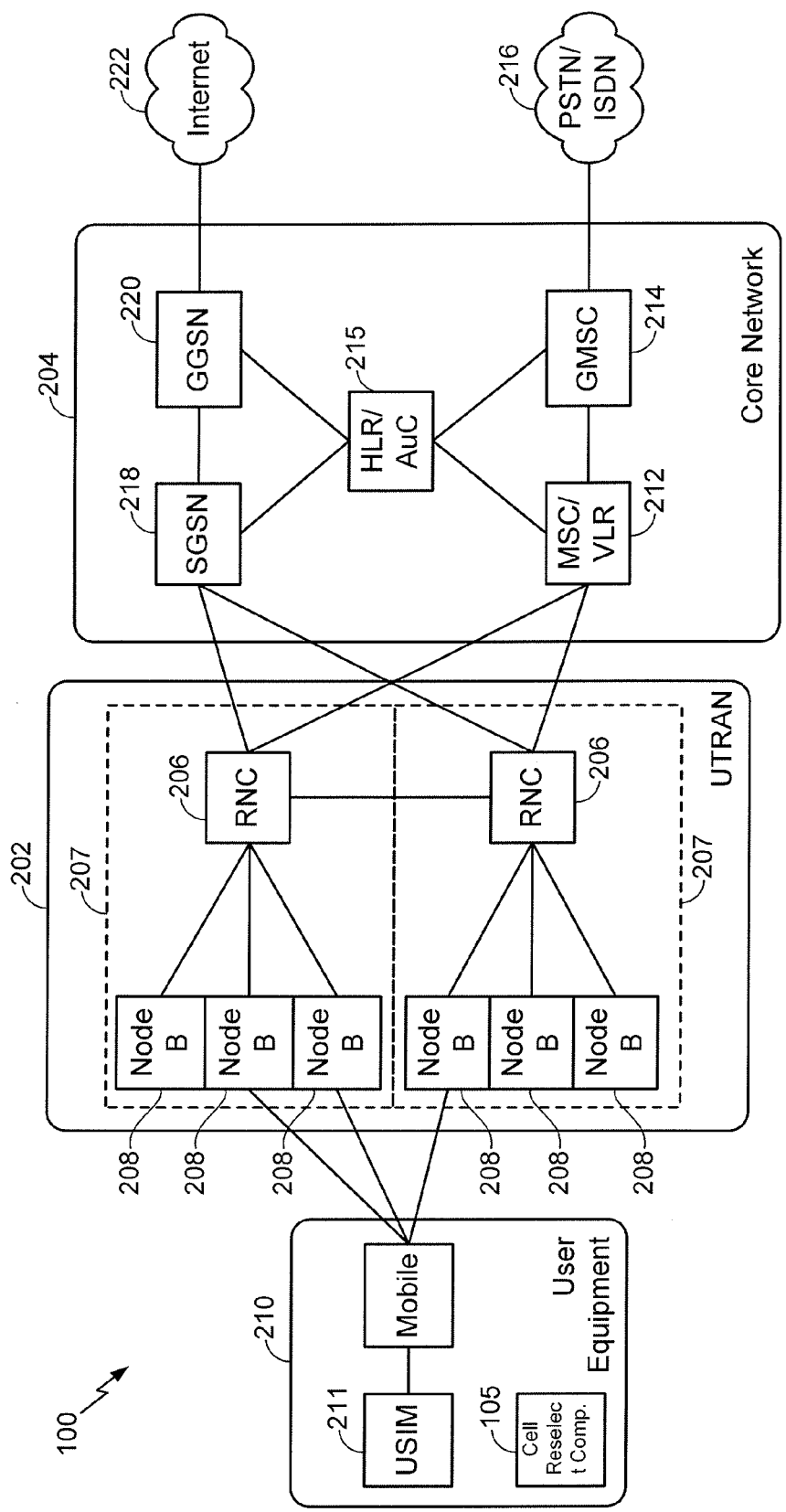
FIG. 1 is a block diagram conceptually illustrating an example of a telecommunications system.

The various concepts presented throughout the present disclosure may be implemented across a broad variety of telecommunication systems, network architectures, and communication standards. FIG. 1 illustrates various aspects in an example telecommunications system. By way of example and without limitation, the aspects of the present disclosure illustrated in FIG. 1 are presented with reference to a UMTS system 100 employing a W-CDMA air interface. A UMTS network includes three interacting domains: a Core Network (CN) 204, a UMTS Terrestrial Radio Access Network (UTRAN) 202, and a User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1, the MAC layer may be considered layer 2, and the RRC layer may be considered layer 3. Information hereinbelow utilizes terminology introduced in the RRC Protocol Specification, 3GPP TS 25.331 v9.1.0, incorporated herein by reference.

In a UMTS system, the UE 210 may include a universal subscriber identity module (USIM) 211, which contains a user's subscription information to a network, and a cell reselection component 105 (shown as a cell reselect. comp. in FIG. 1). For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provides wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 2:
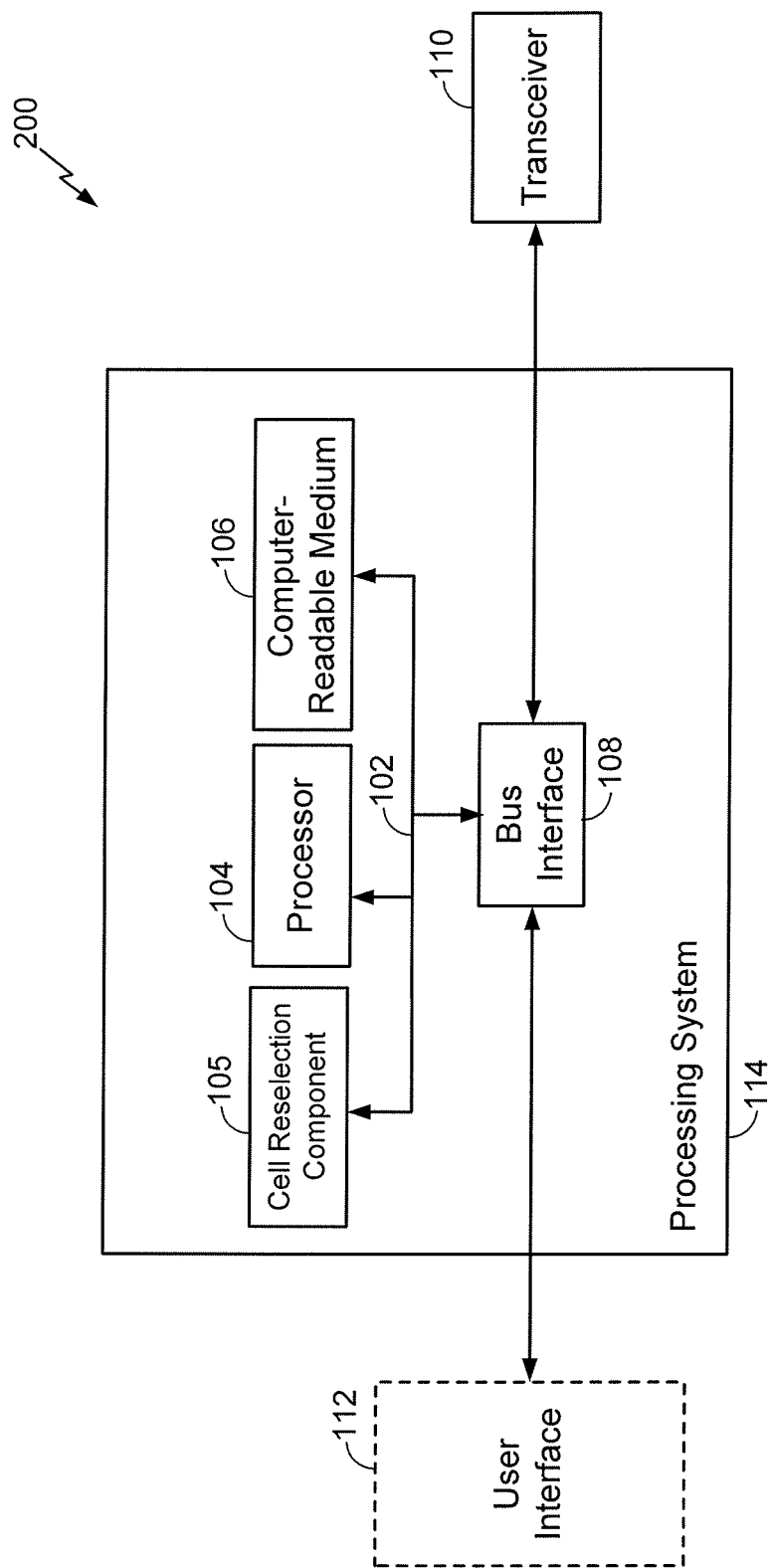
FIG. 2 is a block diagram conceptually illustrating an example of a hardware implementation for an apparatus employing a processing system.

FIG. 2 is a block diagram illustrating an example of a hardware implementation for an apparatus 200 for communications devices such as user equipment or network elements (e.g., UE 210, Node B 208, RNC 206, etc.) shown in FIG. 1. In this example, the apparatus 200 employs a processing system 114, which may be implemented with a bus architecture, represented generally by a bus 102. The bus 102 may include any number of interconnecting buses and bridges depending on the specific application of the processing system 114 and the overall design constraints. The bus 102 links together various circuits including one or more processors, represented generally by the processor 104, one or more cell reselection components, represented generally by the cell reselection component 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus or component. The computer-readable medium 106 may also be used for storing data that is manipulated by the processor 104 when executing software.

The cell reselection component 105 is configured to perform various functions relating to cell reselection in accordance with various aspects or features described herein. In some aspects, at least a portion of the operation, functions, and/or features of the cell reselection component 105 may be implemented by the processor 104 and/or the computer-readable medium 106.

Figure 3:
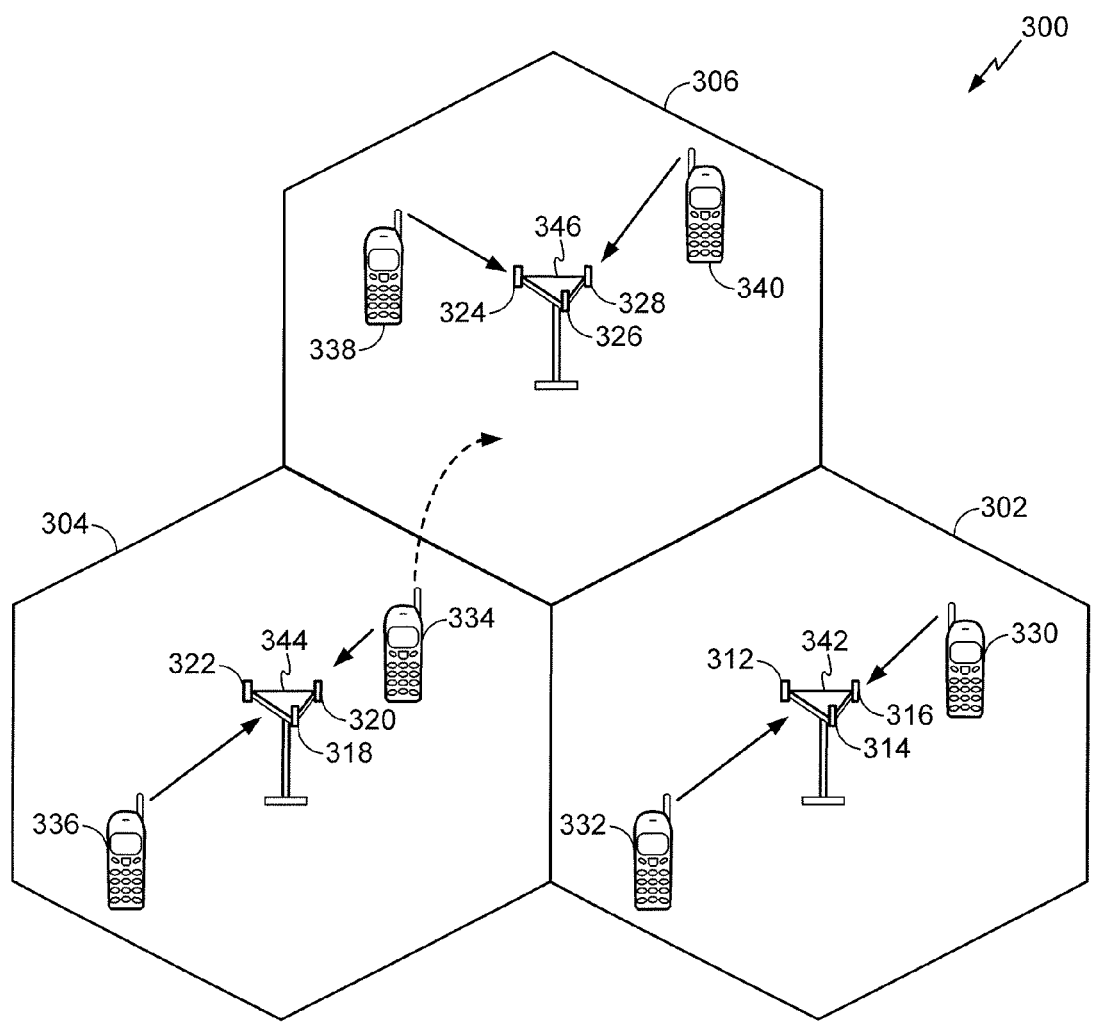
FIG. 3 is a diagram conceptually illustrating an example of an access network.

Referring to FIG. 3, by way of example, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipments (UEs), which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 1) for all the UEs 330, 332, 334, 336, 338, 340 in the respective cells 302, 304, and 306. One or more of the UEs in FIG. 3 may include a cell reselection component 105 (see e.g., FIG. 1).

The UE 344 maintains a list of allowed public land mobile network (PLMN) types. As the UE 334 moves from a cellular coverage area to another cellular coverage area (e.g., from the cell 304 to the cell 306), the UE 334 performs various operations including cell selection and/or reselection processes, as described in portions of 3GPP TS 25.304 and 3GPP TS 36.304, some of which are provided below. When in idle mode, the UE 334 is camped on a call to get access to services, e.g., limited service (emergency calls on an acceptable cell), normal services (for public use on a suitable cell), and operator service (for operators only on a reserved cell). The cells are categorized according to which services they offer: acceptable cell, suitable cell, barred cell, and reserved cell. For example, an "acceptable cell" is a cell on which the UE 344 may camp to obtain limited service (originate emergency calls). A "suitable cell" is a cell on which the UE 344 may camp on to obtain normal services. The cell is part of either the selected PLMN, or the registered PLMN, or a PLMN of the equivalent PLMN list according to the latest information provided by a network.

In certain situations, access to a cell can be barred by the network. For example, a cell can be barred if it is so indicated in the system information in a broadcast message from the network. Also, a cell can be reserved if it is so indicted in the system information in a broadcast message from the network. Further, in certain situations, the standards require that a cell is barred for cell reselection for a period of time (e.g., 300 seconds). For example, 3GPP TS 25.304 Section 5.2.6.1.3, v10.0.0 (2011-03) provides in pertinent part: "If the highest ranked cell or best cell according to absolute priority reselection rules is an intra-frequency or inter-frequency cell which is not suitable due to . . . belonging to a PLMN which is not indicated as being equivalent to the registered PLMN, the UE shall not consider this cell and other cells on the same frequency, as candidates for reselection for a maximum of 300 s . . . . If the highest ranked cell or best cell according to absolute priority reselection rules is an inter-RAT cell which is not suitable due to . . . belonging to a PLMN which is not indicated as being equivalent to the registered PLMN, the UE shall not consider this cell and other cells on the same frequency as candidates for reselection for a maximum of 300 s." It is noted that in the standard the words "300 s" means 300 seconds.

Similarly, 3GPP TS 36.304 Section 5.2.4.4, V11.6.0 (2013-12) provides in pertinent part: "If the highest ranked cell or best cell according to absolute priority reselection rules is an intra-frequency or inter-frequency cell which is not suitable due to . . . belonging to a PLMN which is not indicated as being equivalent to the registered PLMN, the UE shall not consider this cell and other cells on the same frequency, as candidates for reselection for a maximum of 300 s . . . . If the highest ranked cell or best cell according to absolute priority reselection rules is an inter-RAT cell which is not suitable due to . . . belonging to a PLMN which is not indicated as being equivalent to the registered PLMN, the UE shall not consider this cell as a candidate for reselection for a maximum of 300 s." In accordance with certain aspects of the present disclosure, however, these standard requirements are not applied. That is, if best cell according to absolute priority reselection rules or the highest ranked cell belongs to the UE's HPLMN or EHPLMN, the UE may consider this cell and other cells on the same frequency, as candidates for reselection.

Referring back to FIG. 3, as the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 1), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 4A:
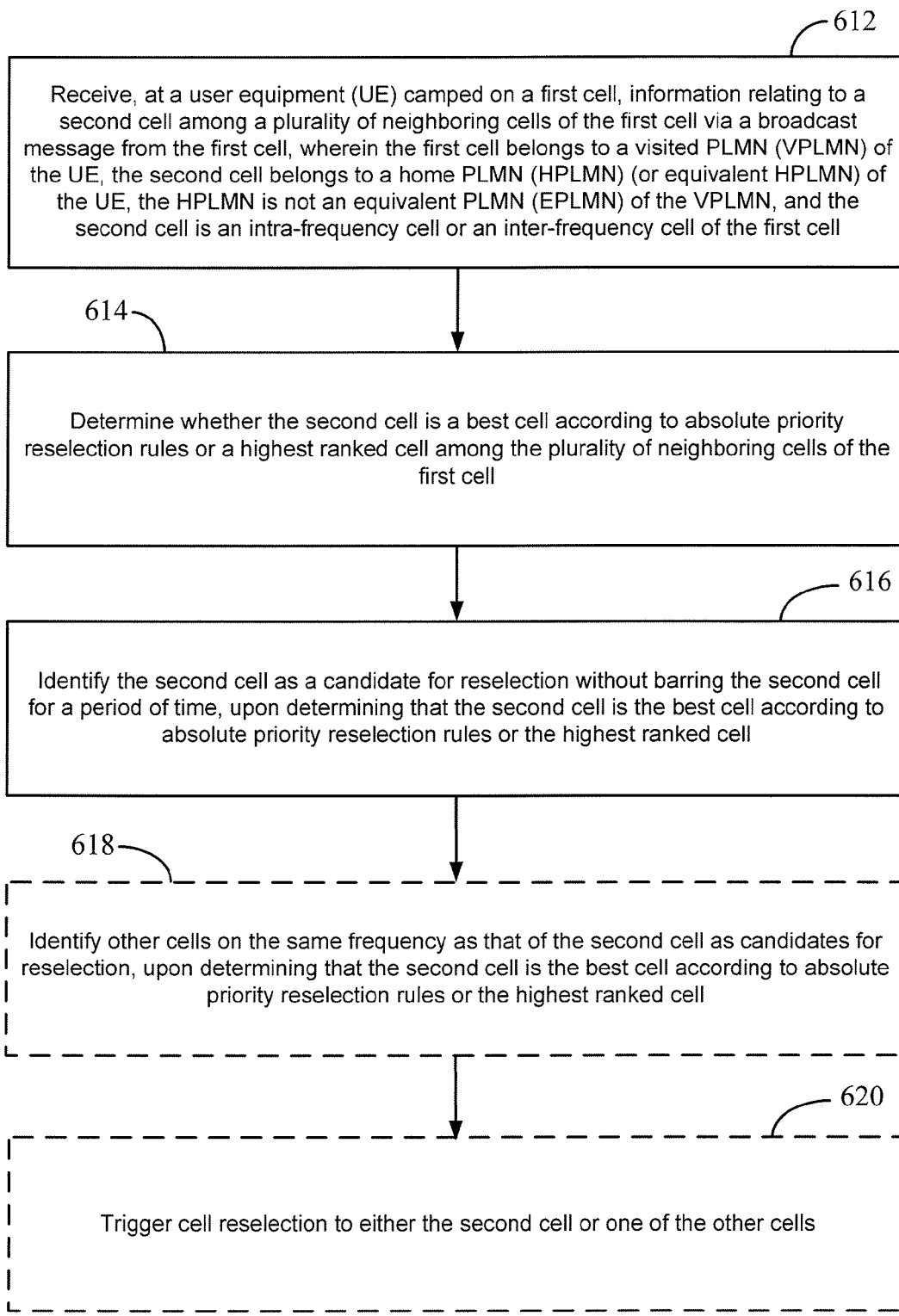
FIGS. 4A and 4B are example flowcharts in accordance with certain aspects of the present disclosure.
Figure 4B:
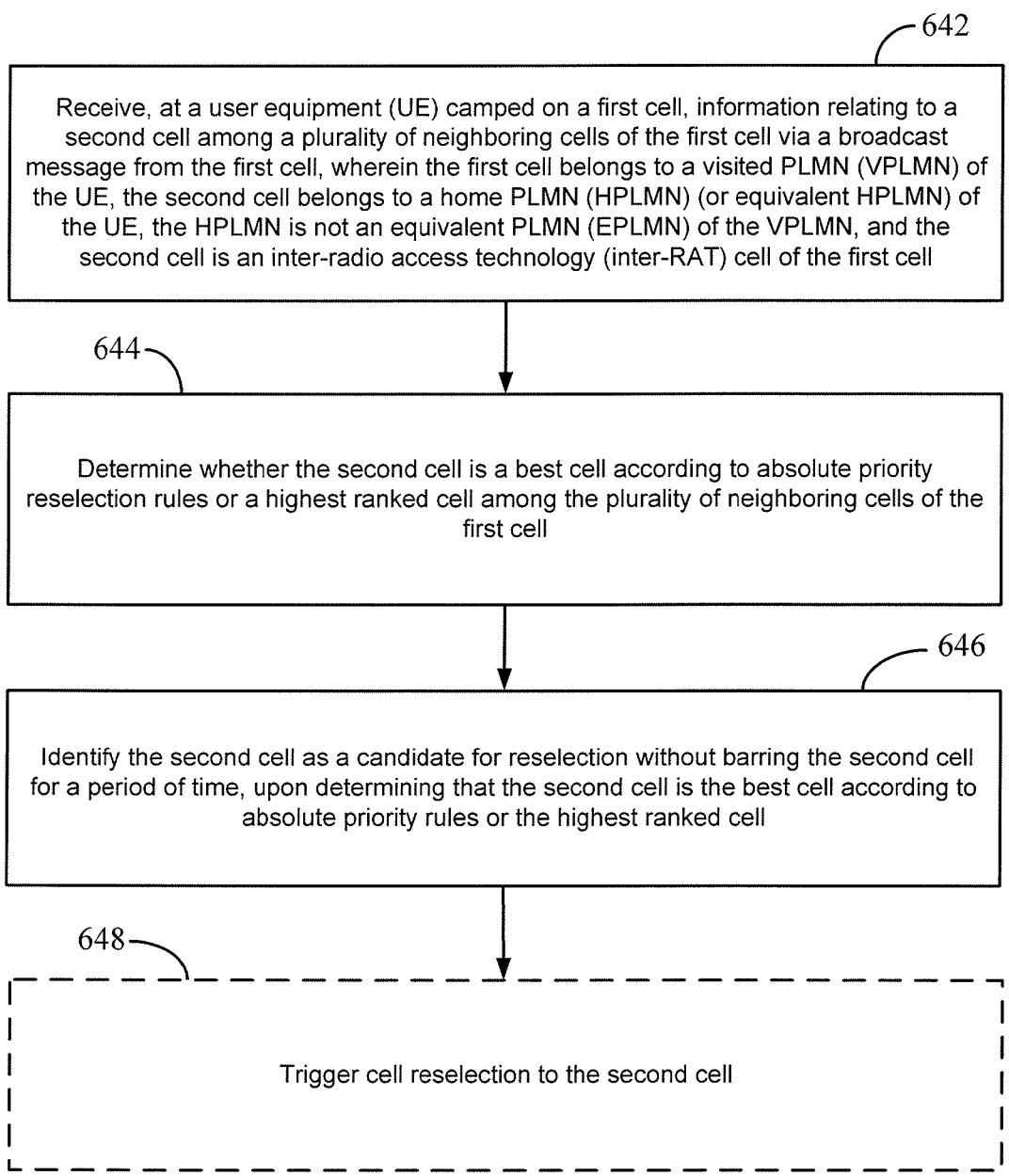

FIGS. 4A and 4B provide example flowcharts in accordance with certain aspects of the present disclosure, in particular, aspects relating to cell reselection operations. For illustration purposes, a brief description of how the UE 210 initially camps on a cell and performs cell reselection procedures is provided below.

When the UE 210 (or UE 330, 332, 336, 338, 340, or 344) is switched on, a PLMN is selected and the UE 210 searches for a suitable cell of this PLMN to camp on. Criteria for cell selection and reselection between radio-access technologies (RATs) are specified in 3GPP TS 25.304 and 3GPP TS 36.304, which are incorporated herein by reference. The UE 210 searches for a suitable cell of the selected PLMN and chooses that cell to provide available services, and tunes to its control channel. This choosing is known as "camping on the cell." The UE 210 will, if necessary, then register its presence in the registration area of the chosen cell and, as an outcome of a successful Location Registration (LR), the selected PLMN becomes the registered PLMN of the UE 210. If the UE 550 finds a more suitable cell, it reselects onto that cell and camps on it. If the new cell is in a different registration area, another location registration is performed. Also, camping on a cell during an idle mode of the UE 210 can be performed for multiple purposes. For example, (i) the camping of the UE 210 on a cell enables the UE 210 to receive system information from the cell belonging to the PLMN, (ii) when registered and if the UE 210 wishes to establish an RRC connection, the UE 210 can establish the RRC connection by initially accessing the network on a control channel of the cell on which the UE 210 has camped, (iii) if the PLMN receives a call for the registered UE 210, the PLMN knows the registration area of the cell in which the UE 210 is camped, and (iv) it enables the UE 210 to receive cell broadcast messages or services.

By way of example, for normal service, the UE 210 has to camp on a suitable cell, and tune to that cell's control channel(s) so that the UE 210 can receive various information including system information from the PLMN. The system information from the PLMN is sent to the UE 210 via one or more broadcast messages over the air from the cell (e.g., using the cell's control channel(s)) on which the UE 210 has camped. The system information, among other information, includes information on the neighboring cells of the cell. During the idle mode, the UE 550 selects a suitable cell and the radio access mode based on idle mode measurements and cell selection or reselection criteria. When camped on a cell, the UE 210 regularly searches for a better cell according to the cell reselection criteria (e.g., quality of service, signal strength, etc.). If a better cell is found, that cell is selected. The change of cell may imply a change of RAT and the cell reselection process is based on various criteria including certain measurement rules. The UE 210 may perform measurements on all intra-frequency, inter-frequency and inter-RAT cells listed in the system information as specified in the Requirements for Support of Radio Resource Management standards. Based on certain criteria and collected data including the intra-frequency cell measurements, inter-frequency cell measurements, and inter-RAT cell measurements, the cells are numerically ranked and the highest ranked cell (or the best cell according to absolute priority reselection rules) among the neighboring cells of the current cell is determined.

As specified in, for example, 3GPP TS 25.304 Section 5.2.6.1.4 (or 3GPP TS 36.304 Section 5.2.3.4), the highest ranked cell or best cell (including serving cell) can be determined according to cell reselection criteria and/or absolute priority reselection rules. The UE 210 may check if the access is restricted according to the rules described in 3GPP TS 25.304 Section 5.3.1.1 (or 3GPP TS 36.304 Section 5.3.1). If that cell and other cells have to be excluded from the candidate list, as specified in 3GPP TS 25.304 Section 5.3.1.1 (or 3GPP TS 36.304 Section 5.3.1), the UE 210 may not consider these as candidates for cell reselection. If the best cell according to absolute priority reselection rules or the highest ranked cell is an intra-frequency or inter-frequency cell that is not suitable due to being part of the list of forbidden Location Areas (Las) for roaming, the UE 210 does not consider this cell and other cells on the same frequency, as candidates for reselection, for a maximum of 300 seconds, as specified in 3GPP TS 25.304 Section 5.2.6.1.3 (or 3GPP TS 36.304 Section 5.2.4.4). If the highest ranked cell is an inter-RAT cell which is not suitable due to being part of the list of forbidden LAs (or Tracking Areas (TAs)) for roaming, the UE 210 does not consider this cell as a candidate for reselection for a maximum of 300 seconds. Further, the standards specify the best cell according to absolute priority reselection rules or the highest ranked cell will not be considered as a candidate for cell reselection for a specific period of time (e.g., 300 seconds) under certain circumstances. That is, as in 3GPP TS 25.304 Section 5.2.6.1.3 (or 3GPP TS 36.304 Section 5.2.4.4), if the best cell according to absolute priority reselection rules or the highest ranked cell is an intra-frequency or inter-frequency cell (or an inter-RAT cell) which is not suitable due to belonging to a PLMN which is not indicated as being equivalent to the registered PLMN, the UE 210 shall not consider the best cell according to absolute priority reselection rules or the highest ranked cell (or other cells on the same frequency) as candidates for reselection for a maximum of 300 seconds.

In accordance with the present disclosure, however, when the best cell according to absolute priority reselection rules or the highest ranked cell is an intra-frequency, inter-frequency, or inter-RAT cell which is belonging to a PLMN which is not indicated as being equivalent to the registered PLMN of the UE 210, the UE 210 considers or identifies the best cell according to absolute priority rules or the highest ranked cell (or other cells on the same frequency) as candidates for reselection, without barring the best cell according to absolute priority reselection rules, or the highest ranked cell (or other cells on the same frequency) for a period of time (e.g., 300 seconds). That is, in accordance with the present disclosure, even when the conditions are satisfied for a neighboring cell (e.g., belonging to a PLMN which is not indicated as being equivalent to the registered PLMN), if the neighboring cell is the best cell according to absolute priority reselection rules or the highest ranked cell and is an intra-frequency, inter-frequency, or inter-RAT cell, the UE 210 will consider the neighboring cell and/or other cells on the same frequency as a candidate for reselection, without waiting any period of time in compliance with the standards.

FIG. 4A provides an example flowchart for cell reselection to an intra-frequency or inter-frequency cell in accordance with an aspect of the present disclosure. While roaming in different geographic areas or cells, a user equipment (e.g., UE 334 in FIG. 3) camps on a first cell for wireless communications, in which the first cell belongs to a visited PLMN (VPLMN) of the UE 344.

At block 612, the UE 344 (e.g., a receiving component 125 in FIG. 5) receives information relating to a second cell among a plurality of neighboring cells of the first cell via a broadcast message from the first cell (e.g., system information received from the first cell). In this case, it is assumed that the second cell belongs to a home PLMN (HPLMN) of the UE 344, which is not an equivalent PLMN (EPLMN) of the VPLMN of the UE 344, and the second cell is an intra-frequency or inter-frequency cell of the first cell.

At block 614, the UE 344 (e.g., a cell determination component 127 in FIG. 5) determines whether the second cell is best cell according to absolute priority reselection rules or the highest ranked cell among the plurality of neighboring cells of the first cell.

At block 616, upon determining that the second cell is the best cell according to absolute priority reselection rules or the highest ranked cell, in accordance with the present disclosure, the UE 344 (e.g., an identifying component 129 in FIG. 5) identifies and/or considers the second cell as a candidate for reselection, without barring the second cell for a period of time (e.g., wait up to 300 seconds) in accordance with the standard implementation above).

Optionally, at block 618, the UE 344 (e.g., an identifying component 129 in FIG. 5) may identify and/or consider other cells on the same frequency as that of the second cell as candidates for reselection, without barring the other cells on the same frequency for a period of time (e.g., wait up to 300 seconds in accordance with the standard implementation above), upon determining that the second cell is the best cell according to absolute priority reselection rules or the highest ranked cell.

At block 620, optionally, the UE 344 (e.g., a triggering component 131 in FIG. 5) triggers cell reselection to either the second cell or one of the other cells on the same frequency as the second cell.

FIG. 4B provides an example flowchart for cell reselection to an inter-RAT cell in accordance with the present disclosure. While roaming in different geographic areas or cells, a user equipment (e.g., UE 334 in FIG. 3) camps on a first cell for wireless communications, in which the first cell belongs to a visited PLMN (VPLMN) of the UE 334.

At block 642, the UE 344 (e.g., the receiving component 125 in FIG. 5) receives information relating to a second cell among a plurality of neighboring cells of the first cell via a broadcast message from the first cell (e.g., system information received from the first cell). It is also assumed that the second cell belongs to a HPLMN of the UE 344, which is not an EPLMN of the VPLMN of the UE 344, and the second cell is an inter-RAT cell of the first cell. Alternatively, the second cell can belong to an EPLMN of the UE 344.

At block 644, the UE 344 (e.g., the cell determination component 127) determines whether the second cell is a best cell according to absolute priority reselection rules or a highest ranked cell among the plurality of neighboring cells of the first cell.

At block 646, upon determining that the second cell is the best cell according to absolute priority reselection rules or the highest ranked cell, in accordance with the present disclosure, the UE 344 (e.g., the identifying component 129) identifies and/or considers the second cell as a candidate for reselection, without barring the second cell for a period of time (e.g., waiting up to 300 seconds in accordance with the standards implementation discussed earlier).

At block 648, optionally, the UE 344 (e.g., the triggering component 131) triggers cell reselection to the second cell.

As a result, the present technology disclosed herein may reduce a number of unnecessary cell reselection failures and further reduce power consumption of the user equipment, thereby decreasing the cost to end users of the user equipment.

To further illustrate the present technology disclosed herein, a few exemplary scenarios are provided below. In both UMTS and LTE networks, the UE 344 may camp on a cell belonging to a VPLMN of the UE 344 when the UE 344 is roaming away from its home network. In most cases, the cells belonging to HPLMN or EHPLMN are not neighboring cells of the VPLMN of the UE 344. However, there may be a few cases in which the neighbor cells belong to the HPLMN or EHPLMN when the UE 344 roams.

For an inter-frequency or intra-frequency cell reselection scenario, consider a case where the HPLMN of the UE 344 is a UMTS network and the VPLMN of the UE 344 is another UMTS network. The HPLMN is not EPLMN of the VPLMN of the UE 344. The UE 344 camps on a cell (e.g., cell 1) which belongs to the VPLMN. The cell of the VPLMN (e.g., cell 1) broadcasts a cell (e.g., cell 2) which belongs to the HPLMN in its system information, via an air interface, as one of the neighboring cells. Alternatively, cell 2 can belong to an EPLMN. That is, the UE 344 has receives information on cell 2 in its neighbor cell list over the air interface (e.g., part of system information from cell 1). After receiving the system information including information on neighboring cells of cell 1, the UE 344 moves to a border of cell 1 and cell 2, in which the UE 344 obtains various cell measurements of the serving cell 1 and its neighbor cells, including cell 2. The UE 344 determines whether cell 2 is the best cell according to absolute priority reselection rules or the highest ranked cell among a plurality of neighboring cells of cell 1. Here, it is assumed that based on various criteria, cell 2 is ranked as the best cell according to absolute priority reselection rules or the highest ranked cell among the plurality of neighboring cells. In accordance with certain aspects of the present disclosure, the UE 344 then identifies and considers cell 2 as a candidate for reselection without barring cell 2 as a candidate (e.g., without waiting up to 300 seconds). Further, UE 344 may identify and/or consider other cells on the same frequency as that of cell 2 as candidates for reselection, when cell 2 is an intra-frequency or inter-frequency cell. The UE 344 then triggers cell re-selection to cell 2 or one of the other cells on the same frequency as that of cell 2 (when cell 2 is the intra-frequency or inter-frequency cell. Thus, in the example, although cell 2 does not belong to the EPLMN of the currently registered PLMN (e.g., VPLMN of the UE 344), the UE 344 selects cell 2 and/or other cells on the same frequency as that of cell 2 as cell reselection candidates (when cell 2 is the intra-frequency or inter-frequency cell), without complying with the standards requirements Further, the UE 344 can perform cell reselection to an inter-RAT cell. For example, consider a case in which the UE 344 roams and camps on a cell (e.g., cell 1) belonging to a VPLMN (e.g., the VPLMN is a UMTS network) of the UE 344 when the HPLMN of UE 344 is an LTE network (e.g., the HPLMN is an LTE network). As noted earlier, the HPLMN is not EPLMN of the VPLMN of the UE 344. The UE 344 camps on a cell (e.g., cell 1) which belongs to the VPLMN. The cell of the VPLMN broadcasts in its system information, via an air interface, information relating to its neighboring cells including cell 2 which belongs to the HPLMN such that the UE 344 has cell 2 in its neighbor cell list. Alternatively, the neighboring cells including cell 2 can belong to an EPLMN. Afterwards, the UE 344 moves to a border of cell 1 and cell 2. The UE 344 makes various cell measurements for cell reselection to a better cell (e.g., a cell with stronger signal strength and quality). The UE 344 determines whether cell 2 is the best cell according to absolute priority reselection rules or the highest ranked cell among a plurality of neighboring cells of cell 1. After determining that cell 2 is the best cell according to absolute priority reselection rules or the highest ranked cell, the UE 344 identifies and/or considers cell 2 as a candidate for reselection without barring cell 2 for a period of time (e.g., without waiting up to 300 seconds as per the standards) and optionally triggers cell reselection to cell 2.

Further, in one implementation, the HPLMN and VPLMN of UE 344 may be both UMTS networks. Still in another implementation, the HPLMN and VPLMN of UE 344 may be both LTE networks. Further, in another implementation, the HPLMN may be a UMTS network and the VPLMN may be an LTE network. In another implementation, the HPLMN may be an LTE network and the VPLMN may be a UMTS network. Furthermore, both LTE and UMTS may be examples of wide wireless area networks (WWANs).

Figure 5:
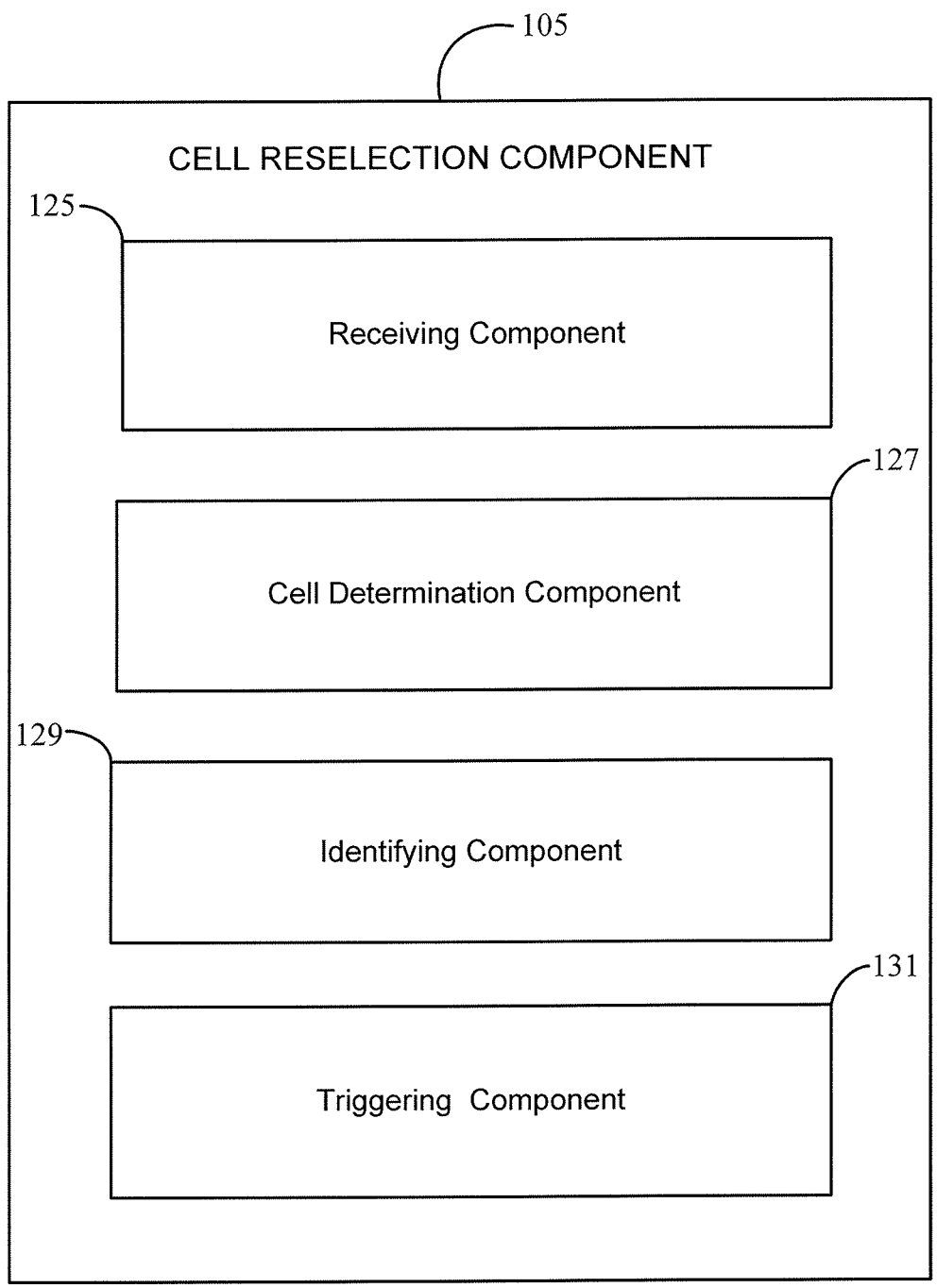
FIG. 5 is a block diagram conceptually illustrating a cell reselection component 105 in accordance with certain aspects of the present disclosure.

In an aspect of the present disclosure, as noted earlier, the UE (or apparatus) 100, 210, 344, or 550 for wireless communication includes a cell reselection component 105. As illustrated in FIG. 5, the cell reselection component 105 includes various components including at least a receiving component 125, a cell determination component 127, an identifying component 129, and a triggering component 131. The receiving component 125 includes a component or means for receiving, at a user equipment camped on a first cell, information relating to a second cell among a plurality of neighboring cells of the first cell via a broadcast message from the first cell. The first cell belongs to a VPLMN of the user equipment, the second cell belongs to a HPLMN, and the HPLMN is not an EPLMN of the VPLMN of the user equipment. The cell determination component 127 includes a component or means for determining whether the second cell is a best cell according to absolute priority reselection rules or a highest ranked cell among the plurality of neighboring cells of the first cell. The identifying component 129 includes a component or means for identifying or selecting the second cell as a candidate for reselection, without barring the second cell for a period of time, upon determining that the second cell is the best cell according to absolute priority reselection rules or the highest ranked cell.

The identifying component 129 may also include a component or means for identifying other cells on the same frequency as the second cell as candidates for reselection, upon determining that the second cell is the best cell according to absolute reselection rules or the highest ranked cell. The triggering component 131 includes a component or means for triggering cell reselection to the second cell. Further, the triggering component 131 may include a component or means for triggering cell reselection to either the second cell or one of the other cells on the same frequency as the second cell.

In one aspect, the aforementioned components or means may be the processor(s) 104 (as shown in FIG. 2) configured to perform the functions recited by the aforementioned means. In another aspect, the aforementioned components or means may be a separate module (e.g., hardware, software or any combination of hardware and software) or any apparatus configured to perform the functions recited by the aforementioned means.

The radio protocol architecture may take on various forms depending on the particular application. By way of example, a radio protocol architecture for an HSPA system will now be presented with reference to FIG. 6.

Figure 6:
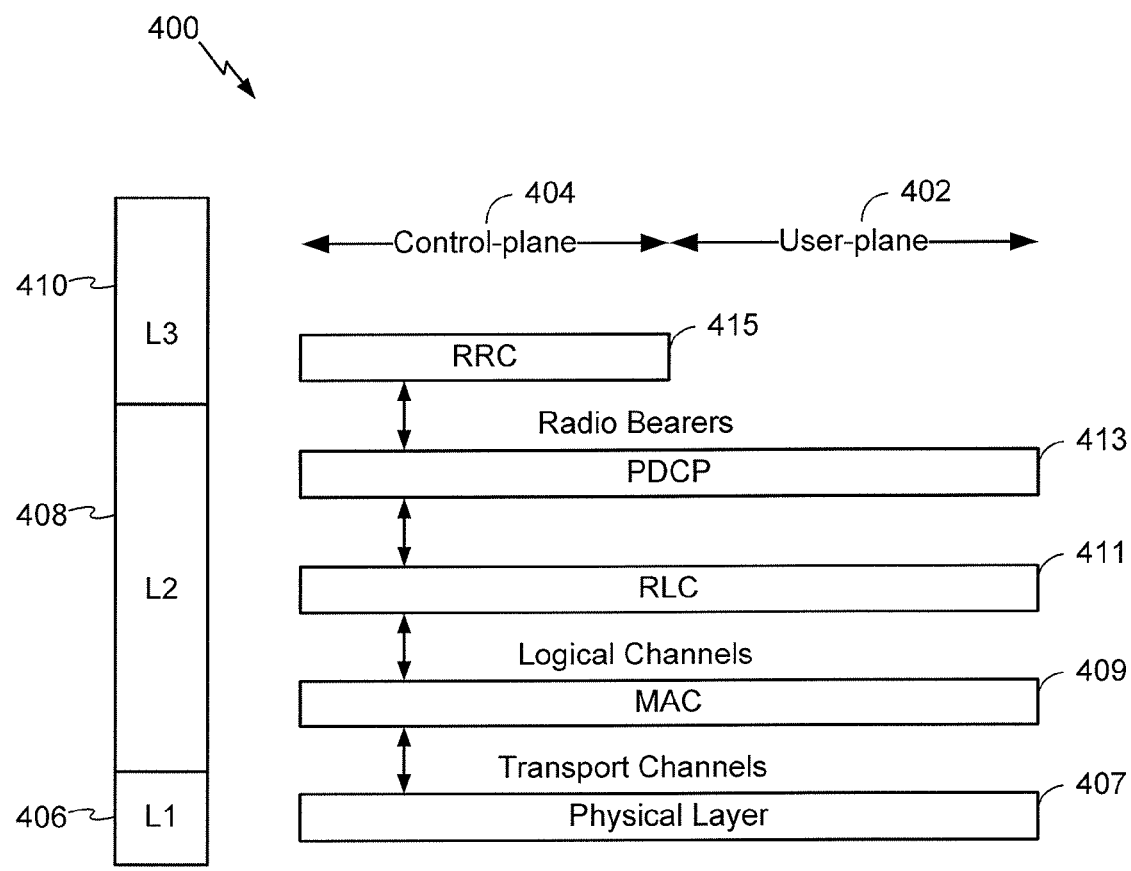
FIG. 6 is a diagram conceptually illustrating an example of a radio protocol architecture for the user and control plane.

Referring to FIG. 6, an example of a radio protocol architecture 400 relates to the user plane 402 and the control plane 404 of a user equipment (UE) or node B/base station. For example, architecture 400 may be included in a UE such as wireless device 210 including a cell reselection component 105 (FIG. 2). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 7:
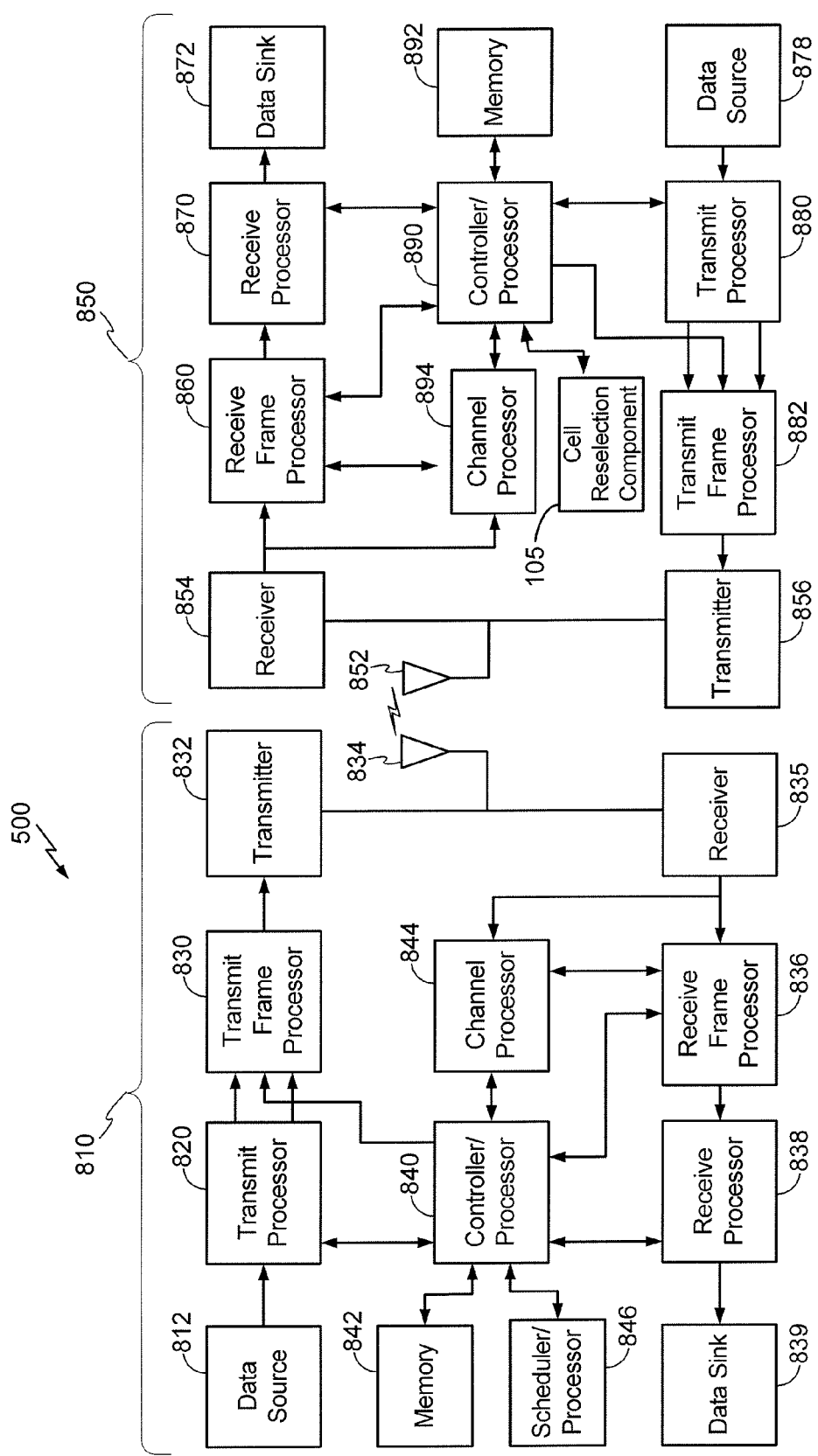
FIG. 7 is a block diagram conceptually illustrating an example of a Node B in communication with a UE in a telecommunications system.

FIG. 7 is a block diagram 500 of a Node B 810 in communication with a UE 850, where the Node B 810 may be the Node B 208 in FIG. 1, and the UE 850 may be the UE 210 in FIG. 1. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, procedures relating to cell selection and reselection, and other control functions. Further, the UE 850 includes a cell reselection component 105 for performing various functions relating to cell reselection procedures in accordance with the present disclosure. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, or 35 U.S.C. §112(f), whichever is appropriate, unless the element is expressly recited using the phrase "means for" or, in the case of a method claim, the element is recited using the phrase "step for."

What is claimed is:

1. A method of wireless communications, comprising:
    receiving, at a user equipment (UE) camped on a first cell, information relating to a second cell among a plurality of neighboring cells of the first cell via a broadcast message from the first cell, wherein the first cell belongs to a visited Public Land Mobile Network (VPLMN) of the UE, the second cell belongs to a home Public Land Mobile Network (HPLMN), and the HPLMN is not an equivalent Public Land Mobile Network (EPLMN) of the VPLMN;
    determining whether the second cell is a best cell according to absolute priority reselection rules or a highest ranked cell among the plurality of neighboring cells of the first cell; and
    Identifying the second cell as a candidate for cell reselection without barring the second cell for a period of time, upon determining that the second cell is the best cell.

2. The method of claim 1, further comprising:
    identifying other cells on the same frequency as that of the second cell as candidates for reselection, upon determining that the second cell is the best cell according to absolute priority reselection rules or the highest ranked cell; and
    triggering cell reselection to either the second cell or one of the other cells.

3. The method of claim 2, wherein the second cell is an intra-frequency cell or an inter-frequency cell of the first cell.

4. The method of claim 1, further comprising:
    triggering cell reselection to the second cell, wherein the second cell is an inter-radio access technology (inter-RAT) cell of the first cell.

5. The method of claim 1, wherein the HPLMN and VPLMN are both Universal Mobile Telecommunications System (UMTS) networks.

6. The method of claim 1, wherein the HPLMN and VPLMN are both Long Term Evolution (LTE) networks.

7. The method of claim 1, wherein the HPLMN is a UMTS network and the VPLMN is an LTE network.

8. The method of claim 1, wherein the HPLMN is an LTE network and the VPLMN is a UMTS network.

9. The method of claim 1, wherein the HPLMN and the VPLMN are both wide wireless area networks (WWANs).

10. An apparatus for wireless communications, comprising:
    means for receiving, at a user equipment (UE) camped on a first cell, information relating to a second cell among a plurality of neighboring cells of the first cell via a broadcast message from the first cell, wherein the first cell belongs to a visited Public Land Mobile Network (VPLMN) of the UE, the second cell belongs to a home Public Land Mobile Network (HPLMN), and the HPLMN is not an equivalent Public Land Mobile Network (EPLMN) of the VPLMN;
    means for determining whether the second cell is a best cell according to absolute priority reselection rules or a highest ranked cell among the plurality of neighboring cells of the first cell; and means for identifying the second cell as a candidate for cell reselection without barring the second cell for a period of time, upon determining that the second cell is the best cell.

11. The apparatus of claim 10, further comprising:
means for identifying other cells on the same frequency as that of the second cell as a candidate for reselection without barring the other cells on the same frequency for a period of time, upon determining that the second cell is the best cell according to absolute priority reselection rules or the highest ranked cell; and
means for triggering cell reselection to either the second cell or one of the other cells.

12. The apparatus of claim 11, wherein the second cell is an intra-frequency cell or an inter-frequency cell of the first cell.

13. The apparatus of claim 10, further comprising means for triggering cell reselection to the second cell, wherein the second cell is an inter-radio access technology (inter-RAT) cell of the first cell.

14. The apparatus of claim 10, wherein the HPLMN and VPLMN are both Universal Mobile Telecommunications System (UMTS) networks.

15. The apparatus of claim 10, wherein the HPLMN and VPLMN are both Long Term Evolution (LTE) networks.

16. The apparatus of claim 10, wherein the HPLMN is a UMTS network and the VPLMN is an LTE network.

17. The apparatus of claim 10, wherein the HPLMN is an LTE network and the VPLMN is a UMTS network.

18. The apparatus of claim 10, wherein the HPLMN and the VPLMN are both wide wireless area network (WWANs).

19. A cell reselection component in a user equipment for wireless communications, comprising:
a memory; and
at least one processor coupled to the memory and configured to execute instructions stored in the memory for:
receiving information relating to a second cell among a plurality of neighboring cells of a first cell on which the user equipment (UE) is camped on, via a broadcast message from the first cell, wherein the first cell belongs to a visited Public Land Mobile Network (VPLMN) of the UE, the second cell belongs to a home Public Land Mobile Network (HPLMN) of the UE, and the HPLMN is not an equivalent Public Land Mobile Network (EPLMN) of the VPLMN;
determining whether the second cell is a best cell according to absolute priority reselection rules or a highest ranked cell among the plurality of neighboring cells of the first cell; and
identifying the second cell as a candidate for cell reselection without barring the second cell for a period of time, upon determining that the second cell is the best cell according to absolute priority reselection rules or the highest ranked cell.

20. The cell reselection component of claim 19, wherein the at least one processor is further configured to execute instructions for:
identifying other cells on the same frequency as that of the second cell as candidates for reselection without barring the other cells for a period of time, upon determining that the second cell is the best cell according to absolute priority reselection rules or the highest ranked cell; and
triggering cell reselection to either the second cell or one of the other cells.

21. The cell reselection component of claim 20, wherein the second cell is an intra-frequency cell or an inter-frequency cell of the first cell.

22. The cell reselection component of claim 19, wherein the at least one processor is further configured to execute instructions for triggering cell reselection to the second cell, and the second cell is an inter-radio access technology (inter-RAT) cell of the first cell.

23. The cell reselection component of claim 19, wherein the HPLMN and VPLMN are both Universal Mobile Telecommunications System (UMTS) networks.

24. The cell reselection component of claim 19, wherein the HPLMN and VPLMN are both Long Term Evolution (LTE) networks.

25. The cell reselection component of claim 19, wherein the HPLMN is a UMTS network and the VPLMN is an LTE network.

26. The cell reselection component of claim 19, wherein the HPLMN is an LTE network and the VPLMN is a UMTS network.

27. The cell reselection component of claim 19, wherein the HPLMN and VPLMN are both wide wireless area networks (WWANs).

28. A non-transitory computer readable medium storing computer executable code, comprising:
code for causing a processor to receive information relating to a second cell among a plurality of neighboring cells of a first cell on which the user equipment (UE) is camped on, via a broadcast message from the first cell, wherein the first cell belongs to a visited Public Land Mobile Network (VPLMN) of the UE, the second cell belongs to a home Public Land Mobile Network (HPLMN) of the UE, and the HPLMN is not an equivalent Public Land Mobile Network (EPLMN) of the VPLMN;
code for causing the processor to determine whether the second cell is a best cell according to absolute priority reselection rules or a highest ranked cell among the plurality of neighboring cells of the first cell; and
code for causing the processor to identify the second cell as a candidate for cell reselection without barring the second cell for a period of time, upon determining that the second cell is the best cell according to absolute priority reselection rules or the highest ranked cell.

* * * * *